20# United States Patent [19]

Molnar et al.

[11] 4,255,240

[45] Mar. 10, 1981

[54] ION-EXCHANGE STRUCTURES OF COPOLYMER BLENDS

[75] Inventors: Charles J. Molnar, Wilmington, Del.; Edward H. Price, Kennett Square, Pa.; Paul R. Resnick, Wilmington, Del.

[73] Assignee: E. I. Du Pont de Nemours and Company, Wilmington, Del.

[21] Appl. No.: 45,413

[22] Filed: Jun. 4, 1979

Related U.S. Application Data

[62] Division of Ser. No. 886,338, Mar. 13, 1978, Pat. No. 4,176,215.

[51] Int. Cl.$^3$ .................................................. C25B 1/46
[52] U.S. Cl. ...................................... 204/98; 204/128; 204/252
[58] Field of Search ........................... 204/252, 98, 128

[56] References Cited

U.S. PATENT DOCUMENTS

| 3,853,720 | 12/1974 | Kororh et al. | 204/128 |
| 4,065,366 | 12/1977 | Oda et al. | 204/296 |
| 4,151,053 | 4/1979 | Seko et al. | 204/98 |
| 4,176,215 | 11/1979 | Molnar et al. | 521/27 |

FOREIGN PATENT DOCUMENTS

| 2510071 | 9/1975 | Fed. Rep. of Germany | 260/2.1 |
| 51-122677 | 10/1976 | Japan | 260/2.1 |
| 51-137684 | 11/1976 | Japan | 260/2.1 |
| 52-24176 | 2/1977 | Japan | 260/2.1 |
| 52-24177 | 2/1977 | Japan | 260/2.1 |
| 52-36589 | 3/1977 | Japan | 521/27 |

*Primary Examiner*—Joseph L. Schofer
*Assistant Examiner*—Peter F. Kulkosky

[57] ABSTRACT

Ion-exchange films, membranes and laminar structures incorporating a layer of a blend of a first fluorinated polymer which contains sulfonyl groups in ionizable form and a second fluorinated polymer which contains carboxylic acid functional groups, when used to separate the anode and cathode compartments of an electrolysis cell, permit operation at high current efficiency and low power consumption. They can be made by synthesis of precursor polymers in melt-fabricable form, blending, fabrication of the film, membrane or laminar structure, and hydrolysis of the functional groups to ionizable form, such as the free acid form or alkali metal salt thereof.

4 Claims, No Drawings

ION-EXCHANGE STRUCTURES OF COPOLYMER BLENDS

CROSS REFERENCE TO RELATED APPLICATION

This application is a division of my prior copending U.S. application Ser. No. 886,338 filed Mar. 13, 1978 and now U.S. Pat. No. 4,176,215.

DESCRIPTION

Technical Field

This invention concerns improvements in and relating to fluorinated ion exchange polymers, and particularly to such polymers used in the form of films and membranes used in chloroalkali electrolysis cells. More specifically, it relates to membranes fabricated from a blend of two or more polymers, one polymer whose ion exchange groups are sulfonyl groups in ionizable form, and a second polymer whose ion exchange groups are carboxylic acid groups or alkali metal salts thereof.

BACKGROUND ART

Fluorinated ion exchange films and membranes are known in the art. The fluorinated ion exchange polymer in such films and membranes can be, for example, one whose functional groups are sulfonic acid groups, or alkali metal or ammonium salts thereof. Typical examples of such polymers are those described in U.S. Pat. Nos. 3,282,875, 3,624,053, and 3,849,243. The fluorinated ion exchange polymer can also be, for example, one whose functional groups are carboxylic acid groups or salts thereof. Typical examples of such polymers are those described in British Pat. No. 1,145,445 and U.S. Pat. No. 3,506,635.

Although such films and membranes have many desirable properties which make them attractive for use in the harsh chemical environment of a chloralkali cell, such as good long-term chemical stability, their current efficiencies are not as high as is desired, especially when the caustic is produced at high concentration. As transport of hydroxyl ion in a chloroalkali cell from the catholyte through the membrane to the anolyte increases, current efficiency drops. Larger amounts of oxygen impurity in the chlorine are thereby produced, and there is a greater buildup of chlorate and hypochlorite contaminants in the brine, which contaminants must be removed and discarded to maintain acceptable cell operation. Current efficiencies of at least 90% are highly desirable.

Accordingly, there is a need for improved films and membranes which will permit cell operation at high current efficiencies, and especially for those which will permit operation at high efficiencies over long periods of time. Additionally, it was desired to find a method for modifying the composition of known membranes so as to obtain membranes which have the high current efficiencies desired.

DISCLOSURE OF INVENTION

It has now been found that an improved ion exchange film or membrane can be made which is a blend of a fluorinated polymer which has sulfonyl functional groups and a polymer which has carboxylic acid functional groups.

More specifically, according to the present invention, there is provided an ion exchange film or membrane of a blend of 1 to 99% by wt. of a first fluorinated polymer which contains sulfonyl groups in ionizable form and 99 to 1% by wt. of a second fluorinated polymer which contains carboxylic acid groups, or an alkali metal salt thereof.

There is also provided according to the invention films and membranes of melt fabricable fluorinated polymer blends from which the ion exchange films and membranes are made.

There is further provided according to the invention laminar ion exchange structures which comprise one layer which is the blend of fluorinated polymers, and a layer of a fluorinated polymer whose functional groups are sulfonyl groups in ionizable form.

BEST MODE

The films and membranes of the present invention are made by blending a melt-fabricable form of a first fluorinated polymer which contains sulfonyl functional groups and a melt-fabricable form of a second fluorinated polymer which contains carboxylic functional groups.

The melt-fabricable first polymer having sulfonyl functional groups is typically a polymer having a fluorinated hydrocarbon backbone chain to which are attached the functional groups or pendant side chains which in turn carry the functional groups. The pendant side chains can contain, for example,

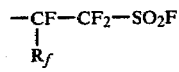

groups wherein $R_f$ is F, Cl, or a $C_1$ to $C_{10}$ perfluoroalkyl radical. Ordinarily, the functional group in the side chains of the polymer will be present in terminal

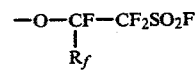

groups. Examples of fluorinated polymers of this kind are disclosed in U.S. Pat. Nos. 3,282,875, 3,560,568 and 3,718,627. More specifically, the polymers can be prepared from monomers which are fluorinated or fluorine substituted vinyl compounds. The polymers are made from at least two monomers, with at least one of the monomers coming from each of the two groups described below.

The first group is fluorinated vinyl compounds such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of copolymers which will be used in electrolysis of brine the precursor vinyl monomer desirably will not contain hydrogen.

The second group is the sulfonyl-containing monomers containing the precursor group

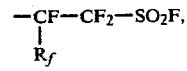

wherein $R_f$ is as defined above. Additional examples can be represented by the general formula $CF_2=CF-T-_k-CF_2SO_2F$ wherein T is a bifunctional fluorinated radical comprising 1 to 8 carbon atoms, and k is 0 or 1. Substituent atoms in T include fluorine, chlorine, or hydrogen, although generally hydrogen will be excluded in use of the copolymer for ion exchange in a chlor-alkali cell. The most preferred polymers are free of both hydrogen and chlorine attached to carbon, i.e., they are perfluorinated, for greatest stability in harsh environments. The T radical of the formula above can be either branched or unbranched, i.e., straight-chain, and can have one or more ether linkages. It is preferred that the vinyl radical in this group of sulfonyl fluoride containing comonomers be joined to the T group through an ether linkage, i.e., that the comonomer be of the formula $CF_2=CF-O-T-CF_2-SO_2F$. Illustrative of such sulfonyl fluoride containing comonomers are $CF_2=CFOCF_2CF_2SO_2F$,

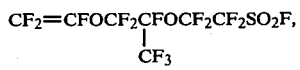

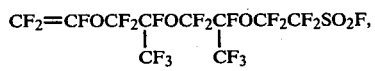

$CF_2=CFCF_2CF_2SO_2F$, and

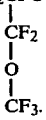

The most preferred sulfonyl fluoride containing comonomer is perfluoro (3,6-dioxoa-4-methyl-7-octenesulfonyl fluoride),

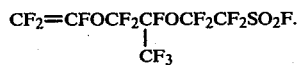

The sulfonyl-containing monomers are disclosed in such references as U.S. Pat. Nos. 3,282,875, 3,041,317, 3,718,627 and 3,560,568.

A preferred class of such polymers is represented by polymers having the repeating units

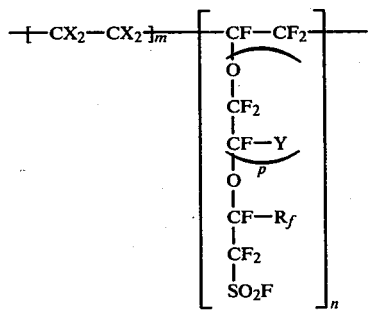

wherein
m is 3 to 15,
n is 1 to 10,
p is 0, 1 or 2,
the X's taken together are four fluorine or three fluorines and one chlorine,
Y is F or $CF_3$, and
$R_f$ is F, Cl or a $C_1$ to $C_{10}$ perfluoroalkyl radical.

The most preferred copolymer is a copolymer of tetrafluoroethylene and perfluoro (3,6-dioxa-4-methyl-7-octenesulfonyl fluoride) which comprises 20 to 65 percent, preferably, 25 to 50 percent by weight of the latter.

When used in a film or membrane to separate the anode and cathode compartments of an electrolysis cell, such as a chloralkali cell, the polymer after conversion to ionizable form should have a total ion exchange capacity of 0.5 to 1.6 meq/g (milliequivalents/gram), preferably from 0.8 to 1.2 meq/g. Below an ion exchange capacity of 0.5 meq/g, the electrical resistivity becomes too high, and above 1.6 meq/g the mechanical properties are poor because of excessive swelling of the polymer. The values of m and n in the above formula of the copolymer should be adjusted or chosen such that the polymer has an equivalent weight no greater than about 2000, preferably no greater than about 1600, for use as an ion exchange barrier in an electrolytic cell. The equivalent weight above which the resistance of a film or membrane becomes too high for practical use in an electrolytic cell varies somewhat with the thickness of the film or membrane. For thinner films and membranes, equivalent weights up to about 2000 can be tolerated. For most purposes, however, and for films of ordinary thickness, a value no greater than about 1600 is preferred.

Such copolymers used in the present invention can be prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, that is, by the polymerization of a mixture of the major monomer therein, such as tetrafluoroethylene, and a fluorinated ethylene containing a sulfonyl fluoride group in the presence of a free radical initiator, preferably a perfluorocarbon peroxide or azo compound, at a temperature in the range 0°–200° C. and at pressures in the range 1–200, or more atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene and the like, and inert, liquid chlorofluorocarbons such as 1,1,2-trichloro-1,2,2-trifluoroethane, and the like.

Aqueous techniques for preparing the copolymer of this invention include contacting the monomers with an aqueous medium containing a free-radical initiator to obtain a slurry of polymer particles in non-waterwet or granular form, as disclosed in U.S. Pat. No. 2,393,967, or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. Nos. 2,559,752 and 2,593,583.

The melt-fabricable second polymer having carboxylic functional groups is typically a polymer having a fluorinated hydrocarbon backbone chain to which are attached the functional groups or pendant side chains which in turn carry the functional groups. The pendant side chains can contain, for example,

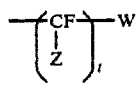

groups wherein Z is F or CF$_3$, t is 1 to 12, and W is —COOR or —CN, where R is lower alkyl. Ordinarily, the functional group in the side chains of the polymer will be present in terminal

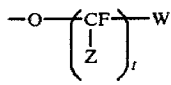

groups. Examples of fluorinated polymers of this kind are disclosed in British Pat. No. 1,145,445 and U.S. Pat. No. 3,506,635. More specifically, the polymers can be prepared from monomers which are fluorinated or fluorine substituted vinyl compounds. The polymers are usually made from at least two monomers. At least one monomer is a fluorinated vinyl compound from the first group described hereinabove in reference to polymers containing —SO$_2$F groups. Additionally, at least one monomer is a fluorinated monomer which contains a group which can be hydrolyzed to a carboxylic acid group, e.g., a carboalkoxyl or nitrile group, in a side chain as set forth above. Again in this case, as in the case of the polymers having —SO$_2$F groups, the monomers, with the exception of the R group in the —COOR, will preferably not contain hydrogen, especially if the polymer blend will be used in the electrolysis of brine, and for greatest stability in harsh environments, most preferably will be free of both hydrogen and chlorine, i.e., will be perfluorinated; the R group need not be fluorinated as it is lost during hydrolysis when the functional groups are converted to ion-exchange groups.

One exemplary suitable type of carboxylcontaining monomer is represented by the formula

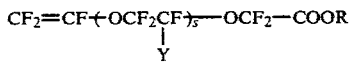

wherein
R is lower alkyl,
Y is F or CF$_3$, and
s is 0, 1 or 2.

Those monomers wherein s is 1 are preferred because their preparation and isolation in good yield is more easily accomplished than when s is 0 or 2. The compound

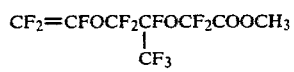

is an especially useful monomer. Such monomers can be prepared, for example, from compounds having the formula

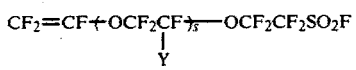

wherein s and Y are as defined above, by (1) saturating the terminal vinyl group with chlorine to protect it in subsequent steps by converting it to a CF$_2$Cl—CFCl— group; (2) oxidation with nitrogen dioxide to convert the —OCF$_2$CF$_2$SO$_2$F group to an —OCF$_2$COF group; (3) esterification with an alcohol such as methanol to form an —OCF$_2$COOCH$_3$ group; and (4) dechlorination with zinc dust to regenerate the terminal CF$_2$=CF— group. It is also possible to replace steps (2) and (3) of this sequence by the steps (a) reduction of the —OCF$_2$CF$_2$SO$_2$F group to a sulfinic acid, —OCF$_2$CF$_2$SO$_2$H, or alkali metal or alkaline earth metal salt thereof by treatment with a sulfite salt or hydrazine; (b) oxidation of the sulfinic acid or salt thereof with oxygen or chromic acid, whereby —OCF$_2$COOH groups or metal salts thereof are formed; and (c) esterification to —OCF$_2$COOCH$_3$ by known methods; this sequence is more fully described in U.S. Ser. No. 789,726 in the names of W. G. Grot, C. J. Molnar and P. R. Resnick, filed Apr. 20, 1977. Preparation of copolymers thereof is described in U.S. Ser. No. 789,727 in the names of C. J. Molnar and P. R. Resnick, filed Apr. 20, 1977.

Another exemplary suitable type of carboxyl-containing monomer is represented by the formula

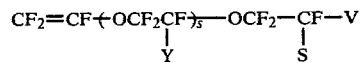

wherein
V is —COOR or —CN,
R is lower alkyl,
Y is F or CF$_3$,
Z is F or CF$_3$, and
s is 0, 1 or 2.

The most preferred monomers are those wherein V is —COOR wherein R is lower alkyl, generally C$_1$ to C$_5$, because of ease in polymerization and conversion to ionic form. Those monomers wherein s is 1 are also preferred because their preparation and isolation in good yield is more easily accomplished than when n is 0 or 2. Preparation of those monomers wherein V is —COOR where R is lower alkyl, and copolymers thereof, is described in U.S. Ser. No. 789,724 in the name of D. C. England, filed Apr. 20, 1977. The compounds

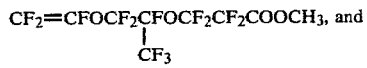

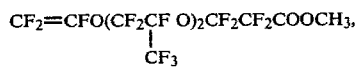

whose preparation is described therein are especially useful monomers. Preparation of monomers wherein V is —CN is described in U.S. Pat. No. 3,852,326.

Yet another suitable type of carboxyl-containing monomer is that having a terminal —O(CF$_2$)$_v$COOCH$_3$ group where v is from 2 to 12, such as CF$_2$=CF—O(CF$_2$)$_3$COOCH$_3$ and CF$_2$=CFOCF$_2$CF(CF$_3$)O(CF$_2$)$_3$COOCH$_3$. Preparation of such monomers and copolymers thereof is described in Japanese Patent Publication Nos. 38586/77 and 28486/77, and in British Pat. No. 1,145,445.

A preferred class of carboxyl-containing polymers is represented by polymers having the repeating units

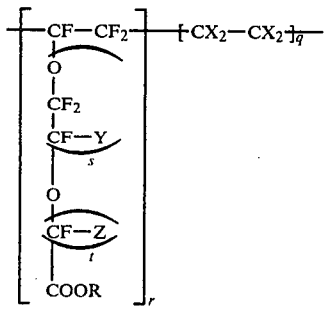

wherein
q is 3 to 15,
r is 1 to 10,
s is 0, 1 or 2,
t is 1 to 12,
the X's taken together are four fluorines or three fluorines and one chlorine,
Y is F or $CF_3$,
Z is F or $CF_3$, and
R is lower alkyl.

The values and preferred values of the ion exchange capacity and equivalent weight of the carboxylic containing copolymer should be in the same ranges as set forth above for copolymers containing sulfonyl groups in ionizable form. Similarly, the same polymerization techniques as set forth above are also suitable.

With respect to the first polymer, which is that which contains sulfonyl functional groups, it is possible to copolymerize therein a small amount of a carboxylic monomer of the kins used in the second polymer, before blending the first and second polymers. Similarly, with respect to the second polymer, which is that which contains carboxylic functional groups, it is possible to copolymerize therein a small amount of a sulfonyl-containing monomer of the kind which is used in the first polymer, before blending the first and second polymers.

The first and second polymers are blended by techniques familiar in the art. Powders, granules or pellets of the individual polymers can first be mixed together. Such a mixture is then subjected to heat and pressure by various means, such as pressing, extruding in a screw extruder, or working on a roll mill or rubber mill. To assure formation of an intimate, uniform blend, the steps can be repeated two or more times. For example, pressed films can be flaked or cut into small pieces and repressed into film. Extruded polymer can be chopped into pellets as it is extruded, and then reextruded. Powders for blending can be made by grinding in a mill; cold grinding in a freezer mill is a useful technique.

The blends of the invention are not limited to two-component blends. Multi-component blends are also possible. One example is a blend of two polymers from the first group with one polymer from the second group; the two polymers from the first group could be different compositions, or be based on the same monomers but having different equivalent weights. Another example is a blend of one polymer from the first group with two polymers from the second group; the two polymers from the second group could be two different carboxylic polymers of different compositions or be based on the same monomers but having different equivalent weights.

The blends may also optionally include an additional inert polymer such as a copolymer of tetrafluoroethylene and perfluoropropylene, a type of copolymer sometimes termed fluroethylenepropylene polymers and well known in the fluoropolymer art.

The blends of the invention are those having at least 1% by wt., preferably 10% by wt., and most preferably 25% by wt. of at least one first fluorinated polymer which contains sulfonyl groups, and complementally, up to 99% by wt., preferably up to 90% by wt., and most preferably up to 75% by wt. of at least one second fluorinated polymer which contains carboxylic functional groups. A blend of about 50% by wt. of each component is highly useful.

The blends of the first and second polymers in melt-fabricable form are fabricated into film and membranes by techniques well known in the art, such as melt pressing and extrusion. Temperatures and pressures will vary depending on the polymer composition. Temperature and pressure must be high enough to provide a coalesced tough film free of holes, but not so high as to cause polymer decomposition. Fabrication temperatures of about 150° C. to 350° C. are generally required, and for many of the polymers 180° C. to 290° C. is preferred. Pressures can range from a few kilograms to many thousands of kilograms.

When the polymer is in the form of a film, desirable thicknesses of the order of 0.025 to 0.5 mm (0.001 to 0.02 inch) are ordinarily used. Excessive film thicknesses will aid in obtaining higher strength, but with the resulting deficiency of increased electrical resistance.

The term "membrane" refers to nonporous structures for separating compartments of an electrolysis cell and which may have layers of different materials, formed, for example, by surface modification of films or by lamination, and to structures having as one layer a support, such as a fabric imbedded therein.

The reinforcement fabric for encapsulation within the membrane can be either woven or unwoven, although a woven fabric is preferred. The individual fibers of the fabric should be able to withstand a temperature from about 240° C. to about 320° C., since these temperatures are employed in the laminating steps. With this proviso, the individual reinforcing fibers can be made from conventional materials, since their main purpose is to strengthen the membrane. Due to chemical inertness, reinforcement materials made from perfluorinated polymers have been found to be preferred. The polymers include those made from tetrafluoroethylene and copolymers of tetrafluoroethylene with hexafluoropropylene and perfluoro(alkyl vinyl ethers) with alkyl being 1 to 10 carbon atoms such as perfluoro(propyl vinyl ether). An example of a most preferred reinforcement material is polytetrafluoroethylene. Supporting fibers made from chlorotrifluoroethylene polymers are also useful. Other suitable reinforcing materials include quartz and glass. Such reinforcement fibers and their use to strengthen polymers in a membrane are well known in the prior art.

It is also possible according to the present invention to make films and membranes which are structured to have one surface which consists of the blends of the present invention and the other surface which consists of a polymer which has pendant side chains which contain sulfonyl groups. The thickness of the blend polymer layer will normally be from 1% to 80% of the total thickness. Laminar structures can be made by melt-pressing together layers of the desired composition. The surface which is the polymer blend can face either the anode or cathode in an electrolysis cell, and in the case of a chloralkali cell it will ordinarily face the cathode.

Under most circumstances, layered structures will be such that the layer of polymer blend will be about 6 to 125 micrometers (¼ to 5 mils) thick, the base layer of sulfonyl polymer will be about 25 to 375 micrometers (1 to 15 mils) thick, and the total thickness of the structure will be about 50 to 500 micrometers (2 to 20 mils) thick. The indicated thicknesses are effective film thicknesses, i.e., thicknesses which exclude reinforcing fibers and other members which do not contain ion exchange groups.

The base layer of the layered or laminar structures can be a fluorinated polymer of known type which has pendant side chains which contain sulfonyl groups. Preferably the pendant side chains may contain

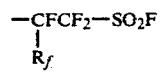

groups where $R_f$ is F, Cl, or a $C_1$ to $C_{10}$ perfluoroalkyl radical. Such polymers are disclosed in U.S. Pat. Nos. 3,282,875, 3,560,568, and 3,718,627.

For use in ion exchange applications and in cells, for example a chloralkali cell for electrolysis of brine, the above described films, membranes and laminar structures should have all of the functional groups converted to ionizable functional groups. Ordinarily and preferably these will be sulfonic acid and carboxylic acid groups, or alkali metal salts thereof. Such conversion is ordinarily and conveniently accomplished by hydrolysis with acid or base, such that the various functional groups described above in relation to the melt-fabricable polymers are converted respectively to the free acids or the alkali metal salts thereof. Such hydrolysis can be carried out with an aqueous solution of a mineral acid or an alkali metal hydroxide. Base hydrolysis is preferred as it is faster and more complete. Use of hot solutions, such as near the boiling point of the solution, is preferred for rapid hydrolysis. The time required for hydrolysis increases with the thickness of the structure. It is also of advantage to include a water-miscible organic compound such as dimethylsulfoxide in the hydrolysis bath.

The films, membranes and laminar structures of the present invention which include polymer blends as described above have advantages over similar structures, which contain, for example, only the sulfonyl polymer or the carboxylic polymer, in exhibiting in an electrolysis cell operation at lower power consumption. They also have the advantage of higher current efficiency than such structures which contain only the sulfonyl polymer, and of lower voltage than similar structures which contain only the carboxylic polymer.

The various copolymers used in the blends described herein should be of high enough molecular weight to produce tough films in both the melt-fabricable precursor form and in the hydrolyzed ion-exchange form.

To further illustrate the innovative aspects of the present invention, the following examples are provided.

EXAMPLE 1

A first copolymer of 61% by wt. of tetrafluoroethylene and 39% by wt. of perfluoro (3,6-dioxa-4-methyl-7-octenesulfonyl fluoride) (having an equivalent weight of 1148 after hydrolysis) was prepared according to the procedure of U.S. Pat. No. 3,282,875. A second copolymer of 63% by wt. of tetrafluoroethylene and 37% by wt. of

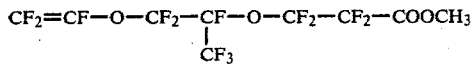

(having an equivalent weight of 1133 after hydrolysis) was prepared according to the procedure of U.S. Ser. No. 789,724 filed Apr. 20, 1977.

A 50:50 blend of the above two copolymers was made by mixing equal weights (2.80 g each) of them and grinding to a powder in a SPEX freezer mill at the temperature of liquid nitrogen. The mixture was pressed to a film in a press at 240° C. and 13,000 kg±500 kg, with a 60-second warm-up period, a 60-second press period, and slow cool down. The film was cut up in small pieces, and again pressed into film under the same conditions. The film was ground to powder in the freezer mill, and the powder pressed a third time under the same conditions into a film 125–150 micrometers (5 to 6 mils) thick. The film was hydrolyzed to an ion exchange film having sulfonic acid and carboxylic acid groups in the potassium salt form by placing it in a bath made up of 392 g of potassium hydroxide (86% by wt. KOH), 1778 ml of water, and 848 ml of dimethylsulfoxide (the bath containing about 13% by wt. potassium hydroxide) at 90° C. for one hour, and then washing in distilled water for 30 minutes. The film was used to separate the anode and cathode compartments of a laboratory-size chloralkali cell, and 26% by wt. aqueous sodium chloride solution placed in the anode compartment was electrolyzed at a current density of 2.0 asi (amps/in²). The following results were obtained.

| Days | Current Efficiency (%) | NaOH (%) | Voltage | Power Consumption Kilowatt Hours/Ton Caustic |
|------|------------------------|----------|---------|----------------------------------------------|
| 1    | 88.0                   | 37.1     | 4.20    | 2830                                         |
| 3    | 94.25                  | 34.7     | 4.10    | 2650                                         |
| 4    | 93.0                   | 34.7     | 4.13    | 2690                                         |
| 9    | 91.68                  | 34.5     | 4.18    | 2760                                         |
| 10   | 93.43                  | 32.9     | 4.11    | 2670                                         |
| 15   | 92.55                  | 33.4     | 4.17    | 2720                                         |
| 25   | 88.43                  | 33.7     | 4.26    | 2930                                         |
| 36   | 88.74                  | 33.6     | 4.26    | 2930                                         |
| 39   | 81.34                  | 41.0     | 4.54    | 3410                                         |
| 40   | 83.84                  | 36.7     | 4.43    | 3210                                         |
| 45   | 83.48                  | 37.1     | 4.38    | 3190                                         |
| 50   | 87.94                  | 24.4     | 3.90    | 2700                                         |
| 60   | 91.91                  | 30.6     | 4.08    | 2700                                         |
| 70   | 86.09                  | 29.1     | 4.08    | 2880                                         |
| 79   | 74.24                  | 43.1     | 4.40    | 3530                                         |
| 80   | 87.52                  | 31.6     | 4.22    | 2930                                         |
| 91   | 84.24                  | 31.5     | 4.26    | 3050                                         |
| 101  | 81.45                  | 35.3     | 4.33    | 3230                                         |

EXAMPLE 2

A 75:25 blend of the first and second copolymers of Example 1 was made by mixing 6.105 g of the first copolymer and 2.035 g of the second copolymer and pressing to a film under the conditions of Example 1. The film was ground to a powder in a freezer mill and again pressed into a film under the same conditions. The film was once more ground into a powder in the freezer mill and pressed under the same conditions into a film 125–150 micrometers thick. The film was hydrolyzed as in Example 1 and also tested in the same manner by electrolysis of brine. The results were as follows.

| Days | Current Efficiency (%) | NaOH (%) | Voltage | Power Consumption Kilowatt Hours/Ton Caustic |
|---|---|---|---|---|
| 1 | 75.29 | 32.2 | 3.87 | 3010 |
| 4 | 80.51 | 39.0 | 4.18 | 3180 |
| 5 | 79.35 | 38.17 | 4.18 | 3220 |
| 7 | 85.23 | 35.9 | 4.16 | 2970 |
| 8 | 82.83 | 35.4 | 4.18 | 3080 |
| 11 | 90.7 | 32.6 | 4.06 | 2730 |
| 15 | 88.9 | 32.7 | 4.06 | 2790 |
| 19 | 88.85 | 32.76 | 4.14 | 2820 |
| 20 | 91.80 | 27.8 | 3.90 | 2600 |
| 23 | 81.37 | 23.7 | 3.79 | 2830 |
| 28 | 78.70 | 23.8 | 3.82 | 2950 |
| 33 | 83.69 | 36.6 | 4.28 | 3110 |
| 39 | 79.59 | 39.1 | 4.39 | 3350 |
| 43 | 77.10 | 22.05 | 3.99 | 3150 |
| 47 | 80.51 | 29.2 | 4.16 | 3140 |

EXAMPLE 3

A 90:10 blend of the first and second copolymers of Example 1 was made by mixing 6.302 g of the first copolymer and 0.7005 g of the second copolymer and extruding the mixture from a melt indexer three times at 260° C. The extrudate was cut into small pieces and hot pressed under the conditions given in Example 1 into a film 125 to 150 micrometers thick. The film was hydrolyzed as in Example 1 and also tested in the same manner by electrolysis of brine. The results were as follows.

| Days | Current Efficiency (%) | NaOH (%) | Voltage | Power Consumption Kilowatt Hours/Ton Caustic |
|---|---|---|---|---|
| 2 | 88.98 | 35.9 | 3.91 | 2670 |
| 7 | 89.08 | 36.3 | 4.02 | 2750 |
| 12 | 78.82 | 30.0 | 3.94 | 3040 |
| 15 | 84.70 | 32.0 | 4.10 | 2940 |
| 18 | 83.09 | 32.5 | 4.15 | 3040 |
| 20 | 85.15 | 32.5 | 4.22 | 3010 |
| 26 | 69.15 | 23.6 | 4.04 | 3550 |
| 28 | 64.27 | 30.4 | 4.12 | 3900 |

EXAMPLE 4

A 25:75 blend of the first and second copolymers of Example 1 was made by mixing 2.44 g of the first copolymer and 7.28 g of the second copolymer, and extruding the mixture from a melt indexer at 260° C. and cutting into small pieces. Extruding from the melt indexer and cutting into small pieces was repeated two additional times. The resulting blend was pressed into a film 125-150 micrometers (5-6 mils) thick under the conditions of Example 1. The film was hydrolyzed as in Example 1, and also tested in the same manner by electrolysis of brine. The results were as follows.

| Days | Current Efficiency % | NaOH % | Voltage | Power Consumption Kilowatt Hours/Ton Caustic |
|---|---|---|---|---|
| 2 | 94.3 | 34.3 | 4.09 | 2610 |
| 6 | 91.1 | 36.6 | 4.26 | 2880 |
| 7 | 96.1 | 36.0 | 4.32 | 2760 |
| 13 | 89.8 | 34.0 | 4.34 | 2930 |
| 19 | 84.4 | 35.3 | 4.31 | 3150 |
| 21 | 90.2 | 36.1 | 4.33 | 2890 |
| 26 | 94.5 | 30.5 | 3.98 | 2570 |
| 29 | 88.1 | 26.4 | 3.82 | 2640 |
| 34 | 88.2 | 24.2 | 3.85 | 2640 |

EXAMPLE 5

A 50:50 blend of sulfonyl and carboxylic polymers as defined herein was made from the following three copolymers: 7.0 g of a first copolymer similar to the first copolymer of Example 1 except that it had an equivalent weight of 1050 after hydrolysis, 5.0 g of a second copolymer similar to the second copolymer of Example 1 except that it had an equivalent weight of 1059 after hydrolysis, and 2.0 of another second copolymer similar to the second copolymer of Example 1 except that it had an equivalent weight of 980 after hydrolysis. The polymers were mixed and the mixture was successively extruded from a melt indexer at 250° C. and cut into small pieces a total of three times. The resulting blend was hot pressed into a film varying from 125 to 200 micrometers (5 to 8 mils) thick, using the conditions of Example 1 except that the temperature was 195° C. The film was hydrolyzed as in Example 1, and also tested in the same manner by electrolysis of brine. the results were as follows.

| Days | Current Efficiency % | NaOH % | Voltage | Power Consumption Kilowatt Hours/Ton Caustic |
|---|---|---|---|---|
| 1 | 86.53 | 34.4 | 4.04 | 2800 |
| 8 | 84.09 | 35.6 | 4.09 | 2960 |
| 10 | 88.50 | 32.4 | 4.08 | 2800 |
| 14 | 87.03 | 31.9 | 4.11 | 2880 |

EXAMPLE 6

A 50:50 blend of the first and second copolymers of Example 1 was made by mixing 3.52 g of the first copolymer and 3.53 g of the second copolymer and hot pressing to a film under the conditions of Example 1. The film was ground to a powder in a freezer mill and again pressed under the same conditions into a film 50 micrometers (2 mils) thick.

Separately, a film of the first copolymer of Example 1 having a thickness of 100 micrometers (4 mils) was also prepared by pressing under the same conditions.

The two films described above were laminated by pressing together at 240° C. under 6800 kg±300 kg. The laminar structure was hydrolyzed as in Example 1 and also tested in the same manner by electrolysis of brine. The results were as follows.

| Days | Current Efficiency % | NaOH % | Voltage | Power Consumption Kilowatt Hours/Ton Caustic |
|---|---|---|---|---|
| 3 | 95.8 | 31.5 | 3.91 | 2460 |
| 6 | 93.9 | 33.6 | 3.93 | 2550 |
| 7 | 98.0 | 33.0 | 3.92 | 2430 |
| 8 | 97.3 | 33.9 | 3.93 | 2460 |
| 9 | 94.2 | 35.3 | 4.10 | 2610 |
| 10 | 95.8 | 36.4 | 4.08 | 2590 |
| 14 | 92.5 | 37.8 | 4.11 | 2720 |
| 17 | 92.1 | 39.5 | 4.08 | 2730 |
| 18 | 87.3 | 39.4 | 4.15 | 2870 |
| 23 | 91.2 | 38.5 | 4.10 | 2710 |
| 24 | 85.9 | 38.7 | 4.09 | 2890 |

-continued

| Days | Current Efficiency % | NaOH % | Voltage | Power Consumption Kilowatt Hours/Ton Caustic |
|---|---|---|---|---|
| 30 | 95.1 | 32.3 | 3.88 | 2480 |
| 35 | 87.3 | 35.7 | 4.05 | 2820 |
| 42 | 90.1 | 32.5 | 4.01 | 2670 |
| 45 | 93.2 | 32.8 | 3.88 | 2530 |
| 52 | 94.5 | 32.2 | 4.00 | 2530 |
| 59 | 93.1 | 32.3 | 4.52 | 2890 |

EXAMPLE 7

Two films 75 micrometers (3 mils) thick of the 50:50 blend prepared in the first paragraph of Example 6 were hot pressed under the pressing conditions of Example 1.

A reinforced laminar structure was then prepared by placing between the two 75-micrometer films prepared above a layer of a fabric of 200-denier polytetrafluoroethylene fibers in a standard basket weave and having woven therewith five 50-denier rayon fibers for each polytetrafluoroethylene fiber (fabric designation T900G) and hot pressing at 240° C. under 4,500 kg±200 kg after a 3-minute preheat at 240° C. and with a slow cool-down while still under pressure. The reinforced laminar structure was hydrolyzed as in Example 1 and also tested in the same manner by electrolysis of brine. The results were as follows:

| Days | Current Efficiency % | NaOH % | Voltage | Power Consumption Kilowatt Hours/Ton Caustic |
|---|---|---|---|---|
| 1 | 86.5 | 33.0 | 4.41 | 3100 |
| 2 | 84.4 | 33.6 | 4.28 | 3080 |
| 6 | 86.3 | 33.5 | 4.40 | 3100 |
| 8 | 86.4 | 33.8 | 4.50 | 3170 |
| 9 | 84.4 | 34.0 | 4.56 | 3280 |
| 14 | 86.7 | 33.9 | 4.81 | 3370 |

EXAMPLE 8

A 50:50 blend of sulfonyl and carboxylic polymers as defined herein was made by mixing 50 g of a first copolymer similar to the first copolymer of Example 1 except that it had an equivalent weight of 1100 after hydrolysis, with 50 g of a second copolymer similar to the second copolymer of Example 1 except that it had an equivalent weight of 963 after hydrolysis. The mixture was blended on a roll mill at 230°–240° C. under nitrogen for five minutes. The resulting blend was cut into small pieces and hot pressed into a film ca. 100 micrometers (4 mils) thick by pressing at 208° C. under 12,700 kg±300 kg for one minute (the pressure was permitted to drift downward over the one-minute period but was raised to 13,200 kg±300 kg just before cooling) after a 2.5-minute preheat at 208° C. under 90 kg±10 kg.

Separately, there was prepared a film 125 micrometers (5 mils) thick of a film of a sulfonyl copolymer like that of Example 1 except that it had an equivalent weight of 1100 after hydrolysis. This film was hydrolyzed on only one suface to a depth of 15 micrometers (0.6 mil) to the sulfonic acid potassium salt form. This film was then reinforced by embedding into the non-hydrolyzed side thereof, using vacuum lamination with vacuum lamination apparatus as described in U.S. Ser. No. 678,535 filed Apr. 20, 1976 in the name of J. C. Solenberger and M. S. Withers (Example 1 thereof), and using the method as described in U.S. Pat. No. 3,925,135, a calendered fabric of 200-denier polytetrafluoroethylene fibers which is a warp knit with weft insertion, 13 threads per inch (5.1 threads per cm) in the warp and 16 threads per inch (6.3 threads per cm) in the weft (fabric designation T-28C).

The two films described above were then laminated together, with the non-hydrolyzed side of the fabric-reinforced film in contact with the film of blended copolymers. The lamination was carried out using the same vacuum lamination apparatus as above and described in U.S. Ser. No. 678,535, with the film of blended copolymers against the vacuum roll which is heated to 240° C., the fabric reinforced film toward the curved stationary plate which is heated to 363° C., the vacuum in the vacuum roll being 81,000 pascals (24 inches of mercury), at a speed of 30.5 cm/min (1 ft./min).

The resulting reinforced laminar structure was hydrolyzed as in Example 1, and also tested in the same manner by electrolysis of brine. The results were as follows.

| Days | Current Efficiency % | NaOH % | Voltage | Power Consumption Kilowatt Hours/Ton Caustic |
|---|---|---|---|---|
| 1 | 88.68 | 35.8 | 4.07 | 2800 |
| 3 | 90.43 | 33.9 | 4.08 | 2740 |
| 7 | 91.17 | 33.2 | 4.06 | 2700 |
| 10 | 92.63 | 34.0 | 4.07 | 2670 |
| 14 | 89.96 | 34.8 | 4.15 | 2800 |

INDUSTRIAL APPLICABILITY

Films, membranes and laminates according to the present invention which comprise a blend of a first fluorinated polymer which contains sulfonyl groups in ionizable form and a second fluorinated polymer which contain carboxylic acid groups or alkali metal salts thereof have utility to function for ion exchange. Accordingly, general utility of such structures for ion exchange is directly contemplated. Illustratively, permeation selection of cations is directly encompssed. One method of determination of cation exchange properties is a measurement of permselectivity with separation of the same cations in solutions but at different concentration. This involves cation transport, and a permselectivity measurement of no voltage would indicate the polymer does not function for ion exchange.

A specific use for the structures of the present invention which contain a blend of fluorinated polymers having both carboxylic and sulfonyl groups is in a chloralkali cell, such as disclosed in German patent application No. 2,251,660, published Apr. 26, 1973, and Netherlands patent application No. 72.17598, published June 29, 1973. In a similar fashion as these teachings, a conventional chloralkali cell is employed with the critical distinction of the type of polymeric structure used to separate the anode and cathode portions of the cell. While the description of said German and Dutch publications is directed to use in a chloralkali cell, it is within the scope of the present disclosure to produce alkali or alkaline earth metal hydroxides and halogen such as chlorine from a solution of the alkali or alkali earth metal salt. While efficiencies in current and power consumption differ, the operating conditions of the cell are similar to those disclosed for sodium chloride.

An outstanding advantage has been found in terms of current efficiency in a chlor-alkali cell with the fluorinated polymer structures of the type disclosed herein.

We claim:

1. An electrolytic cell comprising a housing with separate anode and cathode compartments, said compartments separated by an ion exchange film or membrane of a blend of 10 to 90% by wt. of a first fluorinated polymer which has repeating units

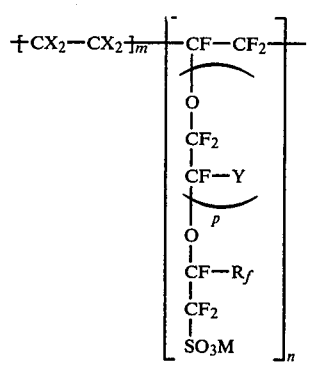

where
m is 3 to 15,
n is 1 to 10,
p is 0, 1 or 2,
the X's taken together are four fluorines or three fluorines and one chlorine,
Y is F or $CF_3$,
$R_f$ is F, Cl or a $C_1$ to $C_{10}$ perfluoroalkyl radical, and
M is H or alkali metal, and 90 to 10% by wt. of a second fluorinated polymer which has repeating units

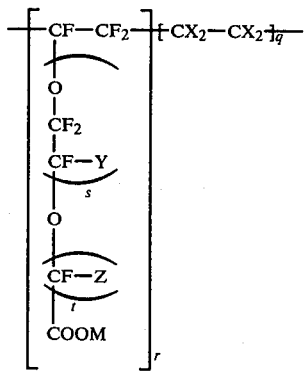

where
q is 3 to 15,
r is 1 to 10,
s is 0, 1 or 2,
t is 2,
The X—s taken together are four fluorines or three fluorines and one chlorines,
Y is F or $CF_3$,
Z is F or $CF_3$, and
M is H or alkali metal.

2. An electrolytic cell comprising a housing with separate anode and cathode compartments, said compartments separated by a laminar structure having a base layer of a fluorinated ion exchange polymer, and having on one surface thereof a layer of a blend of 10 to 90% by wt. of a first fluorinated polymer which has repeating units

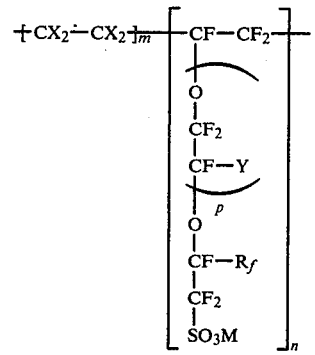

where
m is 3 to 15,
n is 1 to 10,
p is 0, 1 to 2,
the X's taken together are four fluorines or three fluorines and one chlorine,
Y is F or $CF_3$,
$R_f$ is F, Cl, or a $C_1$ to $C_{10}$ perfluoroalkyl radical, and
M is H or alkali metal,
and 90 to 10% by wt. of a second fluorinated polymer which has repeating units

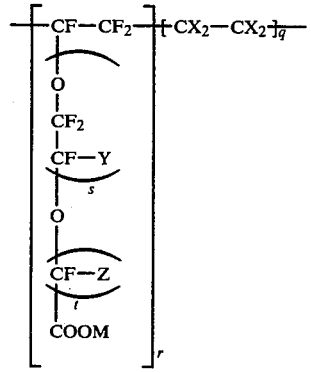

where
q is 3 to 15,
r is 1 to 10,
s is 0, 1, or 2,
t is 2,
the X's taken together are four fluorines or three fluorines and one chlorine,
Y is F or $CF_3$,
Z is F or $CF_3$, and
M is H or alkali metal, each polymer having an equivalent weight no greater than about 2000.

3. In a process for production of halogen and an alkali metal hydroxide by electrolysis of an alkali metal halide in an electrolytic cell having separate anode and cathode compartments, the improvement comprising passing alkali metal ions through a film or membrane of a blend of 10 to 90% by wt. of a first fluorinated polymer which has repeating units

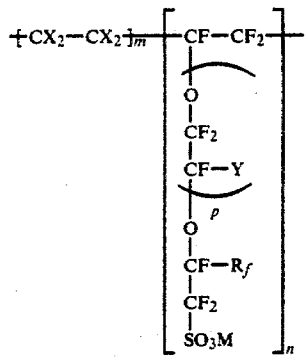

where
  m is 3 to 15,
  n is 1 to 10,
  p is 0, 1 or 2,
  the X's taken together are four fluorines or three fluorines and one chlorine,
  Y is F or $CF_3$,
  $R_f$ is F, Cl or a $C_1$ to $C_{10}$ perfluoroalkyl radical, and
  M is H or alkali metal,
and 90 to 10% by wt. of a second fluorinated polymer which has repeating units

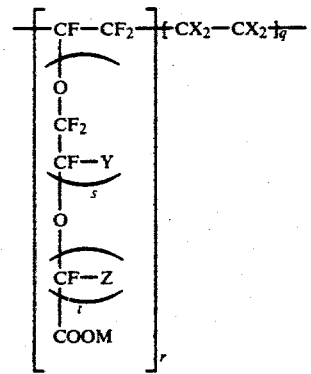

where
  q is 3 to 15,
  r is 1 to 10,
  s is 0, 1 or 2,
  t is 2
  the X's taken together are four fluorines or three fluorines and one chlorine,
  Y is F or $CF_3$,
  Z is F or $CF_3$, and
  M is H or alkali metal.

4. In a process for production of halogen and an alkali metal hydroxide by electrolysis of an alkali metal halide in an electrolytic cell having separate anode and cathode compartments, the improvement comprising passing alkali metal ions through a laminar structure having a base layer of a fluorinated ion exchange polymer, and having on one surface thereof a layer of a blend of 10 to 90% by wt. of a first fluorinated polymer which has repeating units

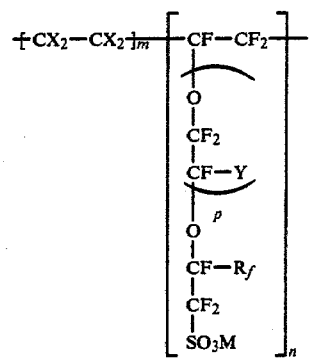

where
  m is 3 to 15,
  n is 1 to 10,
  p is 0, 1 or 2,
  the X's taken together are four fluorines or three fluorines and one chlorine,
  Y is F or $CF_3$,
  $R_f$ is F, Cl, or a $C_1$ to $C_{10}$ perfluoroalkyl radical, and
  M is H or alkali metal,
and 90 to 10% by wt. of a second fluorinated polymer which has repeating units

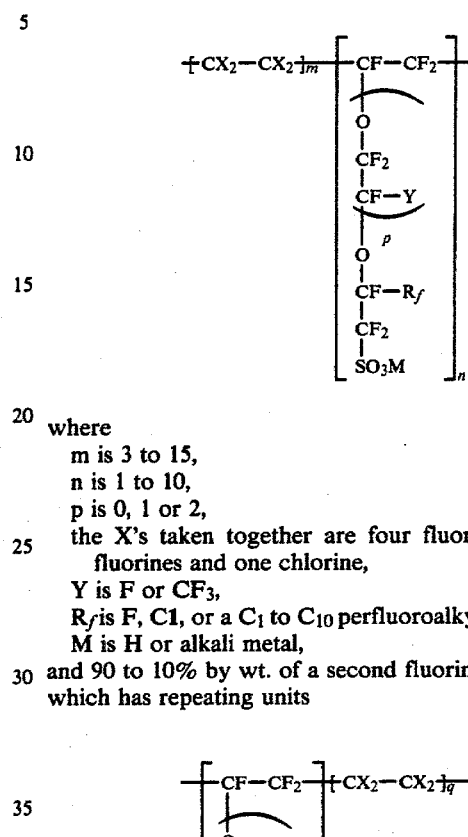

where
  q is 3 to 15,
  r is 1 to 10,
  s is 0, 1, or 2,
  t is 2,
  the X's taken together are four fluorines or three fluorines and one chlorine,
  Y is F or $CF_3$,
  Z is F or $CF_3$, and
  M is H or alkali metal, each polymer having an equivalent weight no greater than about 2000.

* * * * *

UNITED STATES PATENT OFFICE
CERTIFICATE OF CORRECTION

PATENT NO. : 4,255,240

DATED : March 10, 1981

INVENTOR(S) : Charles J. Molnar, Edward H. Price and Paul R. Resnick

It is certified that error appears in the above-identified patent and that said Letters Patent are hereby corrected as shown below:

Column 15, line 59, "X-s" should read --X's--.

Column 15, line 60, "chlorines" should read --chlorine--.

Column 16, line 23 (the line which begins, "p is ..."), "to" should read --or--.

Signed and Sealed this

Seventeenth Day of November 1981

[SEAL]

Attest:

GERALD J. MOSSINGHOFF

Attesting Officer

Commissioner of Patents and Trademarks